United States Patent
Takahashi

(10) Patent No.: US 11,446,888 B2
(45) Date of Patent: Sep. 20, 2022

(54) METHOD AND DEVICE FOR ATTACHING SOUND ABSORBING MEMBER TO TIRE INNER FACE

(71) Applicant: The Yokohama Rubber Co., LTD., Tokyo (JP)

(72) Inventor: Yukihisa Takahashi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 698 days.

(21) Appl. No.: 16/307,907

(22) PCT Filed: Feb. 9, 2017

(86) PCT No.: PCT/JP2017/004665
§ 371 (c)(1),
(2) Date: Dec. 6, 2018

(87) PCT Pub. No.: WO2017/212682
PCT Pub. Date: Dec. 14, 2017

(65) Prior Publication Data
US 2019/0308452 A1 Oct. 10, 2019

(30) Foreign Application Priority Data
Jun. 6, 2016 (JP) .............................. JP2016-112406

(51) Int. Cl.
*B29D 30/06* (2006.01)
*B60C 19/00* (2006.01)

(52) U.S. Cl.
CPC ......... *B29D 30/0681* (2013.01); *B29D 30/06* (2013.01); *B60C 19/002* (2013.01)

(58) Field of Classification Search
CPC ..... B60C 19/00; B60C 19/002; B60C 19/003; B60C 19/12; B60C 19/125;
(Continued)

(56) References Cited

U.S. PATENT DOCUMENTS

| 5,164,035 A | * | 11/1992 | Nakajima | ............ | B29D 30/245 |
| | | | | | 156/398 |
| 2003/0047284 A1 | * | 3/2003 | Akiyama | ............. | B29D 30/245 |
| | | | | | 156/415 |

(Continued)

FOREIGN PATENT DOCUMENTS

| JP | 2004-082387 | 3/2004 |
| JP | 2007-168243 | 7/2007 |

(Continued)

OTHER PUBLICATIONS

Kazuto Fujita, JP-2010260255-A, machine translation. (Year: 2010).*

(Continued)

*Primary Examiner* — Robert C Dye
*Assistant Examiner* — Sedef E Paquette
(74) *Attorney, Agent, or Firm* — Thorpe North & Western

(57) ABSTRACT

Provided are a method and a device for attaching a sound absorbing member to an inner face of a tire. In a state that an adhesive is interposed between a first face of a sound absorbing member and an inner face of the tire, the sound absorbing member is placed, and an expandable and contractible bag placed inside the tire is expanded, and the expanded bag presses a second face of the sound absorbing member to bond the first face to the inner face of the tire with the adhesive therebetween.

7 Claims, 5 Drawing Sheets

(58) Field of Classification Search
CPC ............ B29D 30/0681; B29D 30/0685; B29D 30/08; B29D 30/26; B29D 2030/0072; B29D 2030/0077; B29D 2030/0083; B29D 2030/0683; B29D 2030/0686; B29D 2030/0694; B29D 2030/0695; B29D 2030/2614; B29D 2030/2628; B29D 2030/2635; B29D 2030/587; B29D 2030/069; B29D 2030/0691; B29D 2030/265
USPC .................. 152/450; 156/110.1, 416, 417
See application file for complete search history.

(56) References Cited

U.S. PATENT DOCUMENTS

| | | |
|---|---|---|
| 2009/0308523 A1 | 12/2009 | Kuramori |
| 2011/0308706 A1 | 12/2011 | Sandstrom et al. |
| 2012/0000588 A1 | 1/2012 | Tanno et al. |
| 2017/0305209 A1* | 10/2017 | Caracino ................. B60C 5/002 |

FOREIGN PATENT DOCUMENTS

| | | |
|---|---|---|
| JP | 2008-074013 | 4/2008 |
| JP | 2008-246868 | 10/2008 |
| JP | 2008-254337 | 10/2008 |
| JP | 2008-254339 | 10/2008 |
| JP | 2009-298120 | 12/2009 |
| JP | 2010-260186 | 11/2010 |
| JP | 2010-260255 | 11/2010 |

OTHER PUBLICATIONS

Satoshi Kanzawa, JP-2008254337-A, machine translation. (Year: 2008).*
Fujita K, JP-2010260255-A, machine translation. (Year: 2010).*
Takigawa N, JP-2008074013-A, machine translation. (Year: 2008).*
International Search Report for International Application No. PCT/JP2017/004665 dated May 16, 2017, 4 pages, Japan.

* cited by examiner

METHOD AND DEVICE FOR ATTACHING SOUND ABSORBING MEMBER TO TIRE INNER FACE

TECHNICAL FIELD

The present technology relates to a method and a device for attaching a sound absorbing member to an inner face of a tire, more particularly to a method and a device for attaching a sound absorbing member to an inner face of a tire, which are capable of attaching the sound absorbing member to the inner face of the tire with less bonding unevenness while reducing the load applied to the sound absorbing member and the tire.

BACKGROUND ART

In recent years, to reduce tire noise, tires having a sound absorbing member such as sponge attached to an inner face of the tire are put into practical use. Various methods for attaching a sound absorbing member to an inner face of a tire have been proposed (for example, refer to Japan Unexamined Patent Publication No. 2007-168243). Japan Unexamined Patent Publication No. 2007-168243 proposes a method in which an attaching roller is pressed and rolled on the sound absorbing member with an adhesion face facing the inner face of the tire, and the sound absorbing member is attached to the inner face of the tire.

However, in the method in which the roller is pressed and rolled on the sound absorbing member, an excess load may be applied to the sound absorbing member which comes into direct contact with the roller, and bonding unevenness is hardly reduced. Also, when the roller comes into direct contact with the inner face of the tire with some reason, the inner face of the tire may be damaged.

SUMMARY

The present technology provides a method and a device for attaching a sound absorbing member to an inner face of a tire, which are capable of attaching the sound absorbing member to the inner face of the tire with less bonding unevenness while reducing a load applied to the sound absorbing member and the tire.

A method for attaching a sound absorbing member to an inner face of a tire according to an embodiment of the present technology includes the steps of: placing the sound absorbing member with an adhesive interposed between a first face of the sound absorbing member and the inner face of the tire; expanding a bag that is expandable and contractible disposed inside the tire; and bonding the first face to the inner face of the tire with the adhesive between the first face and the inner face of the tire by pressing a second face of the sound absorbing member with the bag that is expanded.

An attaching device configured to attach a sound absorbing member to an inner face of a tire according to an embodiment of the present technology includes a placement platform on which a tire is placed, a bag that is expandable and contractible, the bag being configured to move between the inside and the outside of the tire, and an injection device configured to inject a fluid into the bag via an injection path. The attaching device is configured such that in a state that the sound absorbing member is placed with a first face facing the inner face of the tire placed on the placement platform and an adhesive is interposed between the first face and the inner face of the tire, the bag is expanded inside the tire, and the bag that is expanded presses a second surface of the sound absorbing member to bond the first face to the inner face of the tire with the adhesive between the first face and the inner face of the tire.

According to the present technology, the second face of the sound absorbing member is pressed by expanding an expandable and contractible bag. To make the bag expandable and contractible, the bag is constituted of a material which has elasticity such as rubber. Therefore, even when the second face of the sound absorbing member is pressed by the expanded bag, no excessive load is applied to the sound absorbing member. Even when the inner face of the tire is pressed by the bag, the tire is not damaged. Accordingly, the load to the sound absorbing member and the tire can be reduced during the attaching work. Compared to the case where the roller is used, the use of the expanded bag allows a wide area to be uniformly pressed at once. Accordingly, the sound absorbing member can be attached to the inner face of the tire with less bonding unevenness.

DETAILED DESCRIPTION

Figure 1:
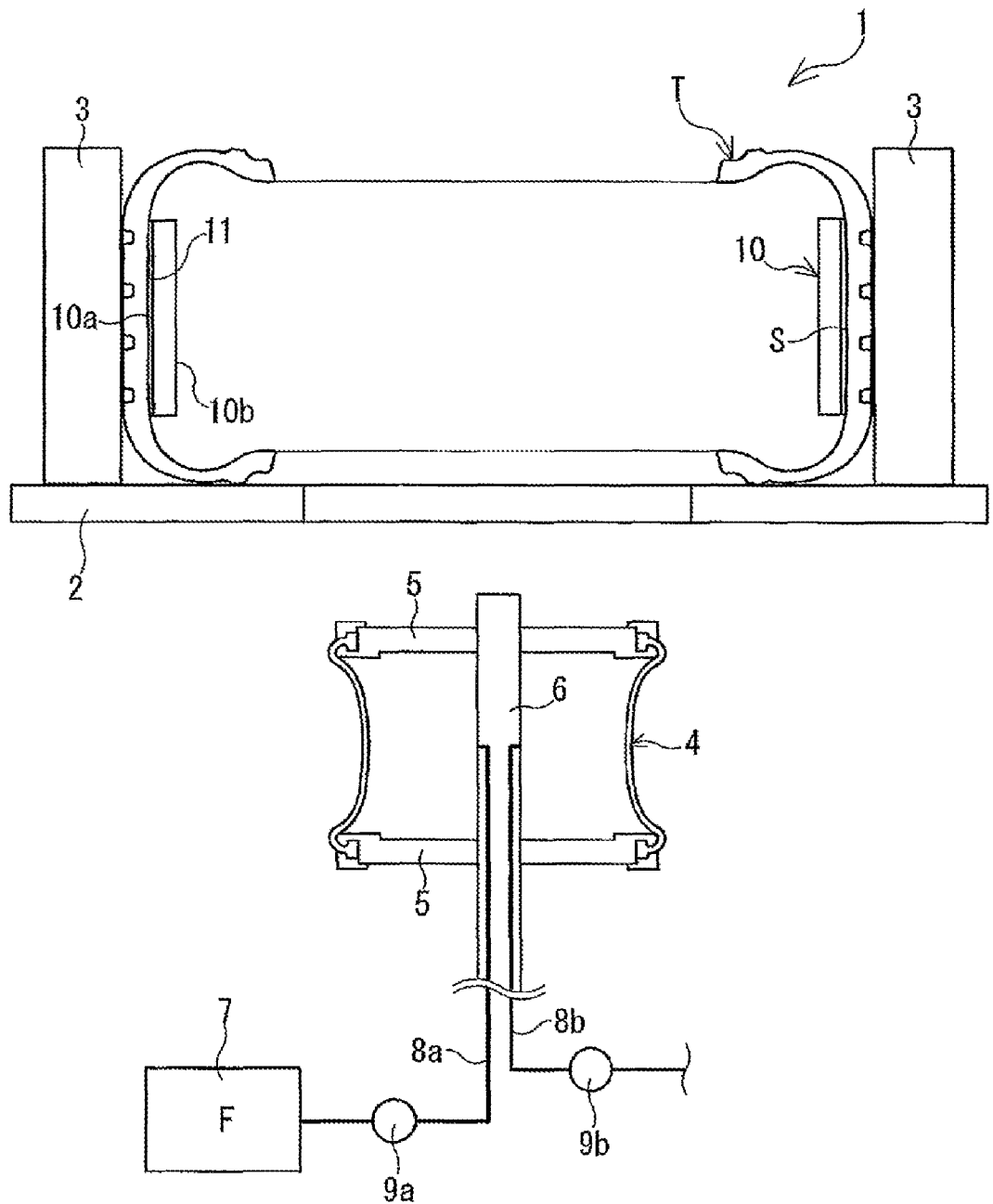
FIG. 1 is an explanatory diagram illustrating an attaching device of the present technology in a vertical cross-sectional view.

A method and a device for attaching a sound absorbing member to a tire inner face according to the present technology will be described below on the basis of the embodiments illustrated in the drawings.

An attaching device 1 configured to attach a sound absorbing member to a tire inner surface according to the present technology illustrated in FIG. 1 and FIG. 2 (hereinafter, referred to as attaching device 1) is used when attaching a sound absorbing member 10 to an inner face S of a vulcanized tire T. The attaching device 1 includes a placement platform 2 on which a tire T is placed, an expandable and contractible bag 4, and an injection device 7 configured to inject a fluid F into the bag 4.

Holding parts 3 configured to hold the tire T in a horizontal state at a predetermined position is provided on the placement platform 2. Of four holding parts 3, at least two holding parts 3 are configured to be movable. With this, even in a case of tires T having various seizes, the four holding parts 3 are brought into contact with the tread surface of the tire, which allows the tire T to be held in an immovable state at the predetermined position. The number and the shape of the holding parts 3 may be appropriately determined.

The bag 4 having a tubular shape is constituted of rubber or a material containing rubber as major material, and has contractility. Disk-shaped clamps 5 are attached to an upper-end opening and a lower-end opening of the bag 4, respectively. Each of the clamps 5 is attached to a center shaft 6, and the distance between the clamps 5 is variable in an axial direction of the center shaft 6.

The center shaft 6 is configured to move in the axial direction with respect to the placement platform 2. With this, the bag 4, which is configured to move together with the center shaft 6, is movable between the inside and the outside of the tire T placed on the placement platform 2. In this embodiment, the center shaft 6 is configured to move to get closer/separate away with respect to the stationary placement platform 2.

The inside of the bag 4 and the injection device 7 are connected to each other with an injection path 8*a* therebetween. In this embodiment, the injection path 8*a* is formed inside the center shaft 6. In the center shaft 6, a discharge path 8*b* allowing the inside and the outside of the bag 4 to communicate with each other is also formed. The injection path 8*a* and the discharge path 8*b* are provided with open/close valves 9*a*, 9*b*, respectively.

As an example of the fluid F which is injected into the inside of the bag 4 via the injection path 8*a* from the injection device 7, a liquid such as hot water, a gas such as air or nitrogen, steam, or the like are given. The bag 4 is expanded by the fluid F injected, and the bag 4 contracts and returns to a neutral state when the fluid F is discharged to the outside via the discharge path 8*b*.

Various kinds of materials having sound absorbing performance such as, for example, a foam formed of a resin or rubber can be used in the sound absorbing member 10. According to the embodiment, a strip-shaped sound absorbing member 10 is attached to the inner face S of the tire T, and the sound absorbing member 10 has a cylindrical shape continuous in a circumferential direction of the tire. The sound absorbing member 10 may be discontinuous in the tire circumferential direction when attached to the inner face S of the tire T.

The sound absorbing member 10 has an adhesive layer formed of an adhesive 11 on a first face 10*a*, and a second face 10*b* is non-adhesive layer. The adhesive 11 may not be previously integrated with the first face 10*a* of the sound absorbing member 10.

The following describes a method for attaching the sound absorbing member 10 to the inner face S of the tire T using the attaching device 1 in detail.

Figure 2:
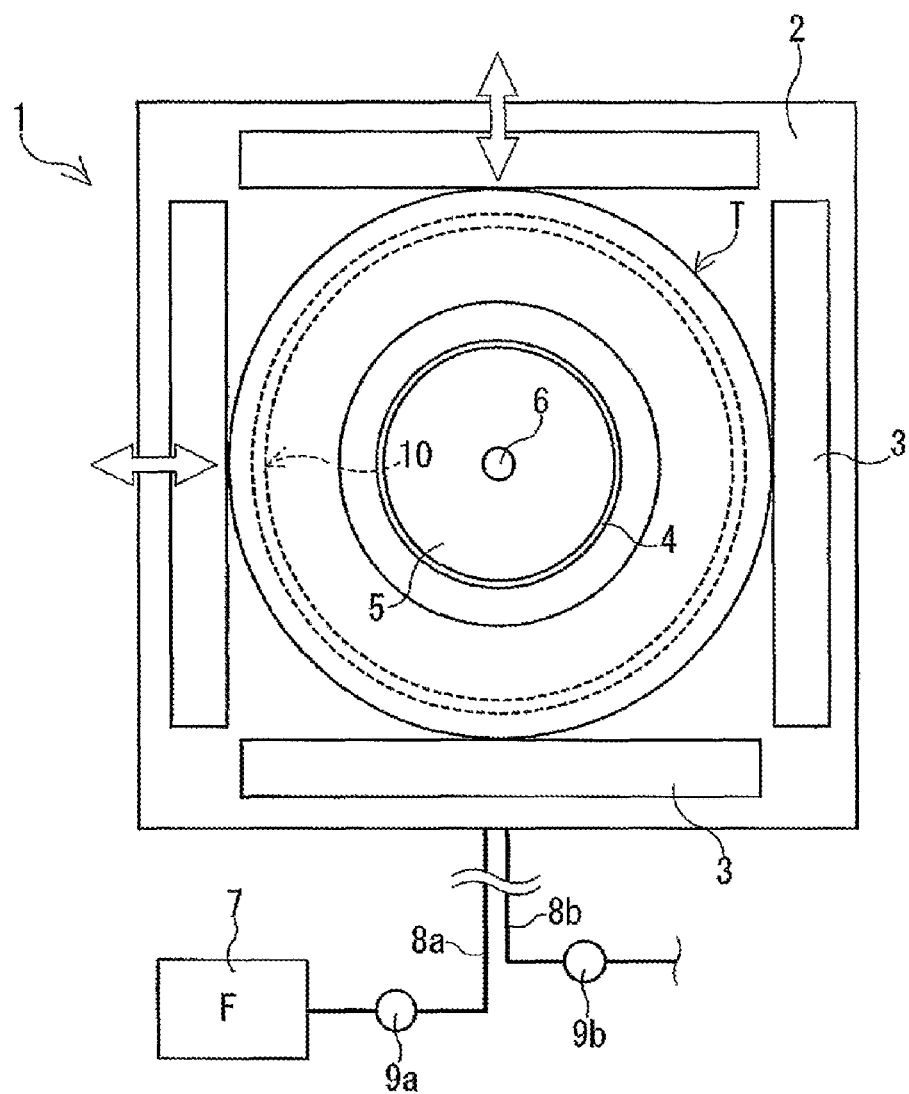
FIG. 2 is an explanatory diagram illustrating the attaching device in FIG. 1 in a plan view.

First, the tire T is placed on the placement platform 2 in a horizontal state as illustrated in FIG. 1 and FIG. 2. The tire T is fixed at the predetermined position by the holding parts 3. The sound absorbing member 10 is inserted inside the tire T manually or using a machine or the like. With this, the sound absorbing member 10 is disposed with the adhesive 11 interposed between the first face 10*a* of the sound absorbing member 10 and the inner face S of the tire T. According to the embodiment, the strip-shaped sound absorbing member 10 is cylindrically disposed on the inner face S while extending in the tire circumferential direction with the first face 10*a* having the adhesive layer formed of the adhesive 11 facing the inner face S corresponding to a tread surface of the tire T.

When using the sound absorbing member 10 which has no adhesive 11 formed integrally with the sound absorbing member 10, the adhesive 11 is applied over the inner face S of the tire T, and then the sound absorbing member 10 is placed on the inner face S of the tire T with the first face 10*a* facing the inner face S of the tire T so that the sound absorbing member 10 is disposed in a state where the adhesive 11 is disposed between the first face 10*a* and the inner face S of the tire T.

Figure 3:
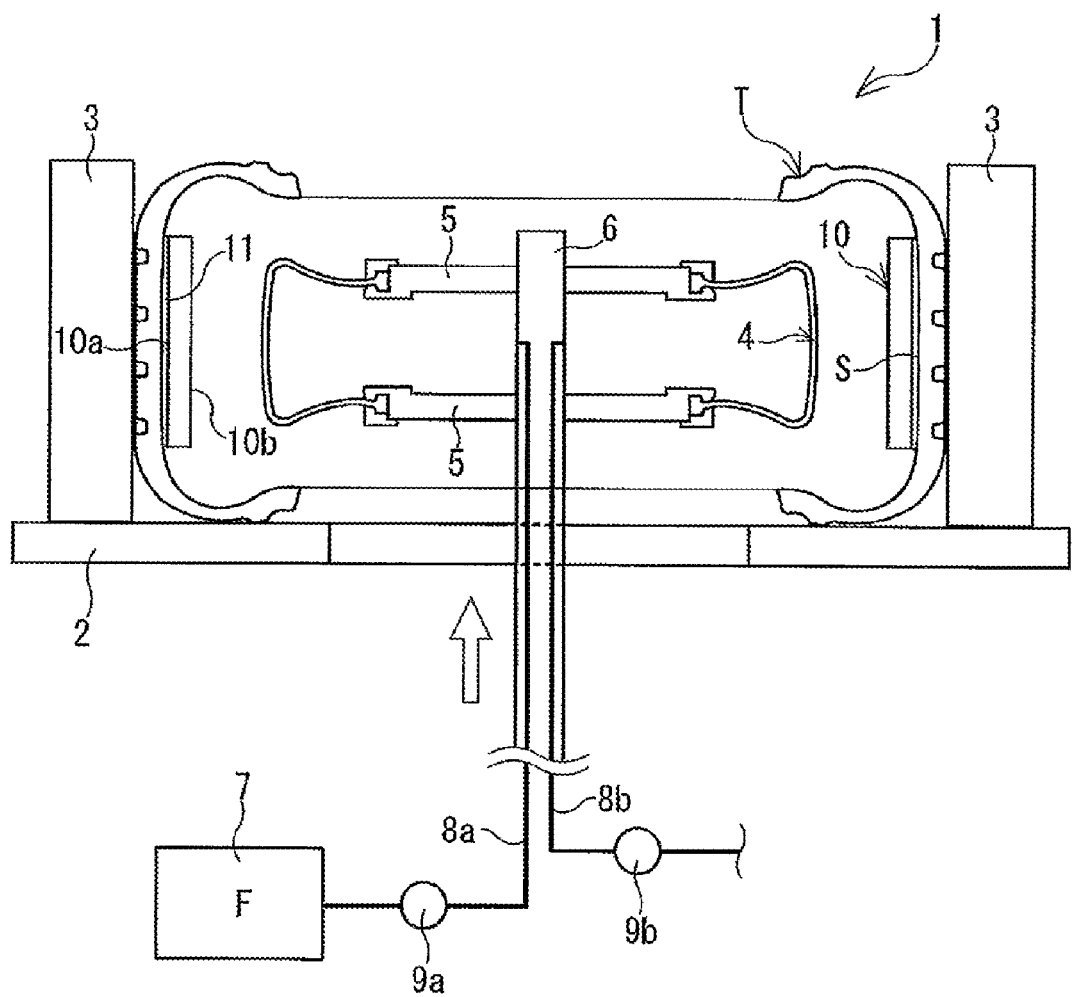
FIG. 3 is an explanatory diagram illustrating a state that the bag in FIG. 1 is disposed inside a tire in a vertical cross-sectional view.

Next, the bag 4 is moved from the outside to the inside of the tire T by moving the center shaft 6 as illustrated in FIG. 3. Here, for example, the respective clamps 5 are positioned inside the tire T by reducing the distance between the clamps 5.

Figure 4:
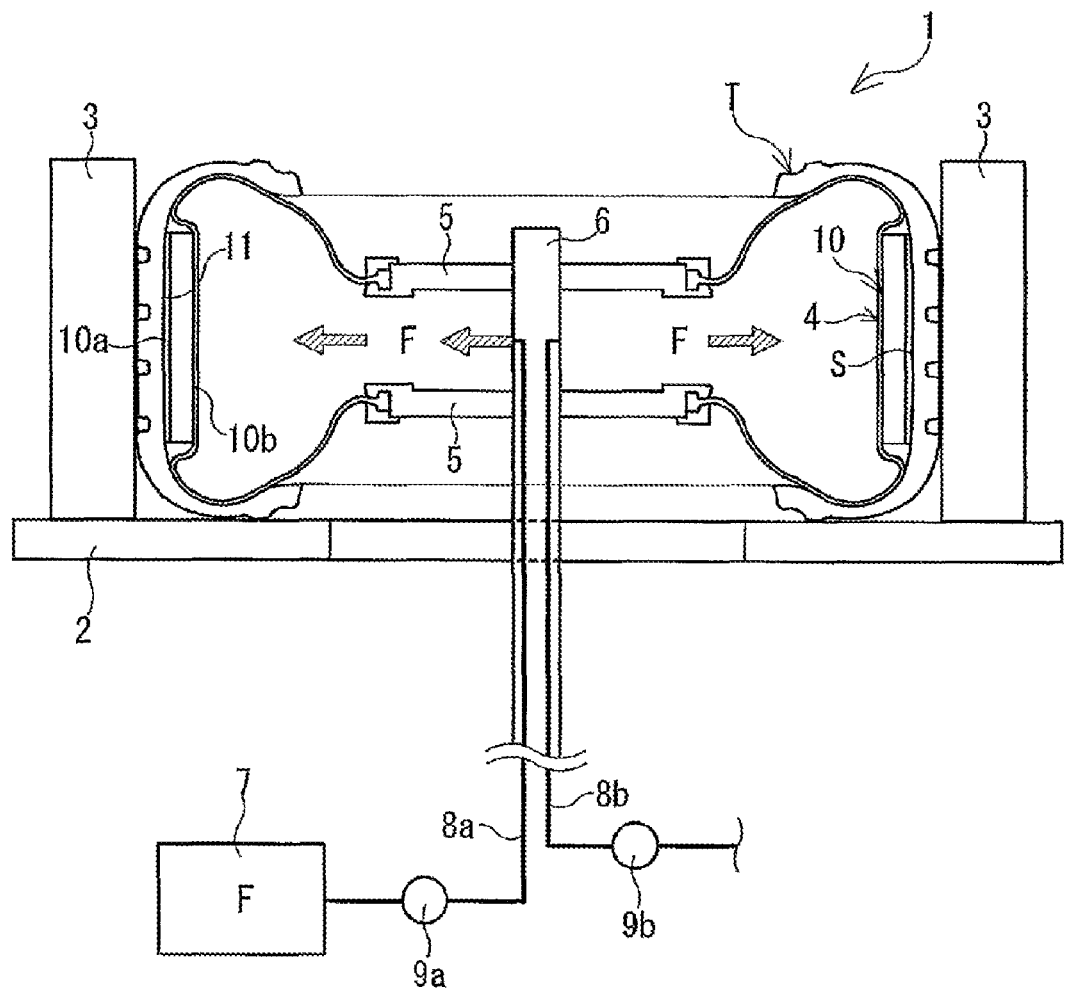
FIG. 4 is an explanatory diagram illustrating a state that a sound absorbing member is being bonded to the inner face of the tire by expanding the bag in FIG. 3 in a vertical cross-sectional view.

Subsequently, the fluid F, which is supplied from the injection device 7 via the injection path 8*a* with the open/close valve 9*a* opened, is injected into the bag 4 as illustrated in FIG. 4. With this, the bag 4 in a contracted state expands into a state that the bag 4 comes into close contact with entire area of the inner face S of the tire T. As a result, the expanded bag 4 presses the second face 10*b* of the sound absorbing member 10, and the first face 10*a* of the sound absorbing member 10 is bonded to the inner face S of the tire 10 via the adhesive 11.

When the sound absorbing member 10 is pressed with a roller constituted of a rigid body such as a metal as in the related art, an excessive load may be applied to the sound absorbing member 10. However, according to the present technology, since the second face 10*b* of the sound absorbing member 10 is pressed by expanding the expandable and contractible bag 4 constituted of rubber or the like, no excessive load is applied to the pressed sound absorbing member 10.

Also, when a roller is used as in the related art and when the inner face S of the tire T is accidentally directly pressed by the roller, the inner face S may be damaged by the roller of a rigid body. However, according to the present technology, the inner face S is not damaged even when the expanded bag 4 directly presses the inner face S of the tire T. Accordingly, the load to the sound absorbing member 10 and the tire T can be reduced during the attaching work.

Compared to the case where the sound absorbing member 10 is pressed using a roller as in the related art, the use of the expanded bag 4 allows a wide area to be uniformly pressed at once. Accordingly, the sound absorbing member 10 can be attached to the inner face S of the tire T with less bonding unevenness.

Since the expanded bag 4 deforms following the shape of the inner face S of the tire T, the embodiment also provides an advantage in that this facilitates the bonding of the sound absorbing member 10 following the shape of the inner face S of the tire T. With this, not only in the inner face S corresponding to the tread surface of the tire T, but in any area of the inner face S of the tire T also, the first face 10*a* of the sound absorbing member 10 can be substantially uniformly pressed by the expanded bag 4.

The as-pressed expanded bag 4 is maintained, for example, for predetermined time. After that, the bag 4 is contracted by discharging the fluid F from the inside of the bag 4 via the discharge path 8*b* with the open/close valve 9*b* opened. After that, the bag 4 is moved from the inside of the tire T to the outside.

The state that the expanded bag 4 presses the sound absorbing member 10 to bond the first face 10*a* of the sound absorbing member 10 to the inner face S of the tire T may be maintained for a predetermined time. With this, the sound absorbing member 10 is reliably and strongly bonded to the inner face S of the tire T with ease. The predetermined time ranges, for example, from one minute to five minutes, preferably is two minutes or more. When the predetermined time is less than one minute, the sound absorbing member 10 is less likely be bonded strongly to the inner face S of the tire T, and the predetermined time exceeding five minutes also provides no change in the bonding state, which results in poor productivity.

The temperature of the fluid F injected into the bag 4 preferably ranges, for example, from 30° C. to 60° C. By setting the temperature of the fluid F higher than the ambient temperature, the expanded bag 4 is heated. When the heated expanded bag 4 presses the sound absorbing member 10, the adhesive 11 is heated and activated. This facilitates stronger bonding of the sound absorbing member 10 to the inner face S of the tire T. However, when the temperature of the fluid F exceeds 60° C., the fluidity of the adhesive 11 becomes too high. This results in a disadvantage in that the sound absorbing member 10 is less likely to be bonded strongly to the inner face S of the tire T.

According to the embodiment, the tire T is placed on the placement platform 2 in a horizontal state. Since the tire T is more stable in the horizontal state than a vertical state, the attaching work of the sound absorbing member 10 is facilitated.

Figure 5:
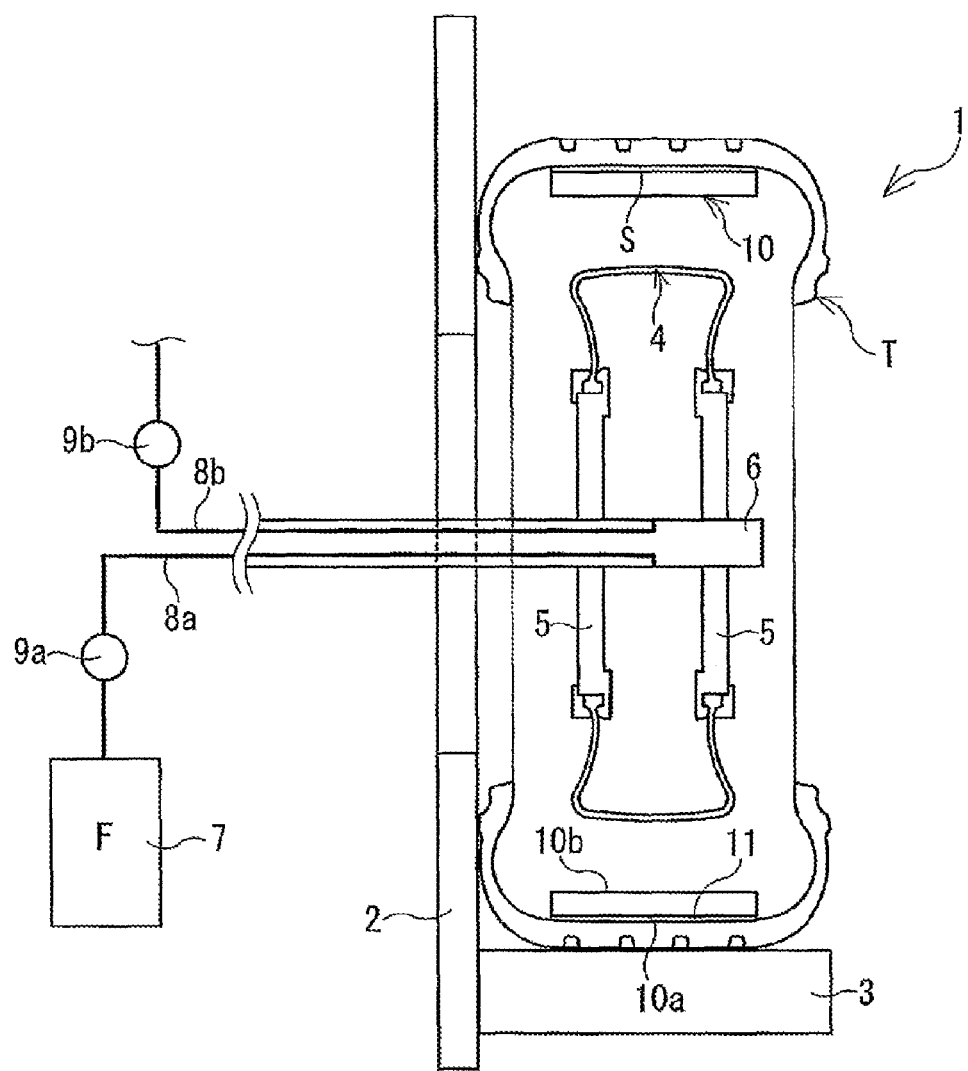
FIG. 5 is an explanatory diagram illustrating another embodiment of an attaching device of the present technology in a vertical cross-sectional view.

The tire T may be placed in a vertical state on the placement platform 2 as in an embodiment illustrated in FIG. 5. The attaching device 1 according to the embodiment has identical configuration to the above described embodiment except that the placement direction of the tire T is different from that in the above described embodiment. The embodiment in which the tire T is placed in the vertical state provides an advantage in that the positioning of the center position of the tire T placed on the placement platform 2 can be easily carried out compared to the case that the tire T is placed in the horizontal state.

The invention claimed is:

1. A method for attaching a sound absorbing member to an inner face of a vulcanized tire, the method comprising the steps of:
    placing the sound absorbing member on the inner face of the vulcanized tire with an adhesive interposed between a first face of the sound absorbing member and the inner face of the vulcanized tire;
    subsequent to placing the sound absorbing member on the inner face of the vulcanized tire, expanding a bag that is expandable and contractible disposed inside the vulcanized tire; and
    bonding the first face to the inner face of the vulcanized tire with the adhesive between the first face and the inner face of the vulcanized tire by pressing a second face of the sound absorbing member with the bag that is expanded.

2. The method for attaching a sound absorbing member to an inner face of a vulcanized tire according to claim 1, wherein a state that the first face is bonded to the inner face of the vulcanized tire by pressing the second face of the sound absorbing member with the bag that is expanded is maintained for a predetermined time.

3. The method for attaching a sound absorbing member to an inner face of a vulcanized tire according to claim 1, wherein the bag is expanded by injecting a fluid having a temperature from 30° C. to 60° C.

4. The method for attaching a sound absorbing member to an inner face of a vulcanized tire according to claim 1, wherein the vulcanized tire is placed in a horizontal state.

5. The method for attaching a sound absorbing member to an inner face of a vulcanized tire according to claim 2, wherein the bag is expanded by injecting a fluid having a temperature from 30° C. to 60° C.

6. The method for attaching a sound absorbing member to an inner face of a vulcanized tire according to claim 5, wherein the vulcanized tire is placed in a horizontal state.

7. The method for attaching a sound absorbing member to an inner face of a vulcanized tire according to claim 1, further comprising moving the bag from outside to inside of the vulcanized tire subsequent to placing the sound absorbing member and prior to expanding the bag.

* * * * *